United States Patent [19]
Petrou et al.

[11] Patent Number: 5,803,404
[45] Date of Patent: Sep. 8, 1998

[54] DOOR ACTUATION SYSTEM HAVING A VARIABLE DAMPING DEVICE

[75] Inventors: Anton A. Petrou, Lombard; Craig H. Scott, Prospect Heights; Stephen B. Warner, Evanston; Jerry D. Hielkema, Franklin Park, all of Ill.

[73] Assignee: MPC Products, Inc., Skokie, Ill.

[21] Appl. No.: 590,121

[22] Filed: Jan. 23, 1996

[51] Int. Cl.⁶ ............................................. B64C 1/24
[52] U.S. Cl. .................................. 244/129.5; 244/129.6; 244/137.2; 188/267; 310/106
[58] Field of Search .......................... 244/129.1, 129.5, 244/118.3, 129.6, 137.2; 188/267; 310/103, 106, 110, 75 D

[56] References Cited

U.S. PATENT DOCUMENTS

| | | | |
|---|---|---|---|
| Re. 34,479 | 12/1993 | Minoura . | |
| 2,933,149 | 4/1960 | Lee .................................. | 244/129.6 X |
| 3,558,945 | 1/1971 | Hulle ................................. | 310/103 X |
| 4,086,726 | 5/1978 | Moses ............................... | 244/129.5 X |
| 4,779,814 | 10/1988 | Uetsuki et al. . | |
| 5,090,640 | 2/1992 | Fessett ............................... | 244/129.5 |
| 5,236,126 | 8/1993 | Sawade et al. . | |
| 5,385,052 | 1/1995 | Hofmann . | |

*Primary Examiner*—William Grant
*Attorney, Agent, or Firm*—Sitrick & Sitrick

[57] ABSTRACT

The damper is comprised of a set of core rotor magnets arranged in an opposing north/south configuration. A conducting material cylindrically encircles the rotor magnets. A set of stator magnets laterally encircle the conducting material and are arranged in the same manner as the rotor magnets. A system of gears are coupled to the damper shaft and control the rotation of the rotor magnets such that they can be positioned relative to the stator magnets to set up the desired damping torque. As the rotor and stator magnets of opposite polarity approach each other, the eddy-current in the rotating conducting material increases causing the conducting material to generate a field in response to the eddy-current. The damping torque is caused by the magnetic force generated when the induced field in the material and the stator/rotor field attempt to line up.

20 Claims, 9 Drawing Sheets

SECTION B-B

VIEW A-A OF FIG. 5

SECTION B-B OF FIG. 6

DOOR ACTUATION SYSTEM HAVING A VARIABLE DAMPING DEVICE

BACKGROUND OF THE INVENTION

1. Field of the Invention

The present invention relates generally to load dampers. More particularly, the present invention relates to magnetic eddy-current dampers.

2. description of the Related Art

Commuter airlines use many aircraft with doors that have built-in stairs. This frees the aircraft from having to rely on ground crews using outside stairs to load and unload passengers.

Smaller doors on light, unpressurized aircraft are light enough to be opened and closed by a flight attendant using a cable attached to the door. However, larger, pressurized planes have heavier doors that cannot be raised or lowered manually. These doors can weigh as much as 300 lbs. Additionally, as the door is being lowered to the open position, it will exert a downward force greater than its weight due to the door extending from the center of rotation by such a large amount.

When a commuter aircraft lands and taxies to the ramp, the ground crew typically disconnects all the batteries as a safety measure. It's possible that a propeller turning in the wind may start a turbine engine, causing severe injury to the ground crew. Also, any spark from these batteries could possibly ignite fuel vapors. Therefore, these heavier doors are typically lowered by hydraulic means built into the doors since electrical power is not available.

The drawback of hydraulic actuators, however, is that after many hours of negative temperatures at an aircraft's cruising altitude, the hydraulic oil's viscosity has greatly increased. This causes the door to lower at a much slower rate than normal. If the passengers had to deplane rapidly due to an emergency, the slow deploying door would be a safety concern. In fact, the Federal Aviation Administration requires that these doors be fully open in 10 seconds. There is a resulting need for an unpowered door actuator that is able to lower a heavy door at a controlled rate. To save weight, this actuator must also be able to perform the dual function of raising the door to the closed position using electrical power.

SUMMARY OF THE INVENTION

The present invention encompasses a load damping system that generates a damping force for a load having a non-linear moment. In the preferred embodiment, this load is an aircraft door. The damper is comprised of a set of core rotor magnets that form a cylindrical shape around a damper shaft These magnets are arranged such that the north poles and the south poles oppose the other pole of the same polarity.

A conducting material that laterally encircles the rotor magnets is used to conduct an eddy current. A set of outer stator magnets, that laterally encircle the conducting material, are arranged in the same manner as the first set of magnets.

A system of gears has an output shaft coupled to the load. The system of gears is coupled to the damper shaft, rotating the conducting material and controlling the rotation of the rotor magnets such that their rotation can be positioned relative to the stator magnets. As the rotor and stator magnets of opposite polarity approach each other, the eddy current is induced in the conducting material. The rotation of the conducting material also causes a magnetic field to form. The magnetic force caused when the induced field in the conducting material and the stator rotor magnets attempts to line up is the damping torque that causes the damping effect of the present invention.

DESCRIPTION OF THE PREFERRED EMBODIMENT

The door actuator and damping system of the present invention provide many benefits to solve the problems of the prior art The actuator raises an aircraft door to the closed position while slowing the rate of closure for the last few seconds. The actuator can also lower the aircraft door, while in a completely unpowered mode, providing a variable damping force to slow the door as it completes its travel to the fully open position. AR of these benefits are provided without the use of hydraulic fluids or microprocessors requiring power.

Figure 1:
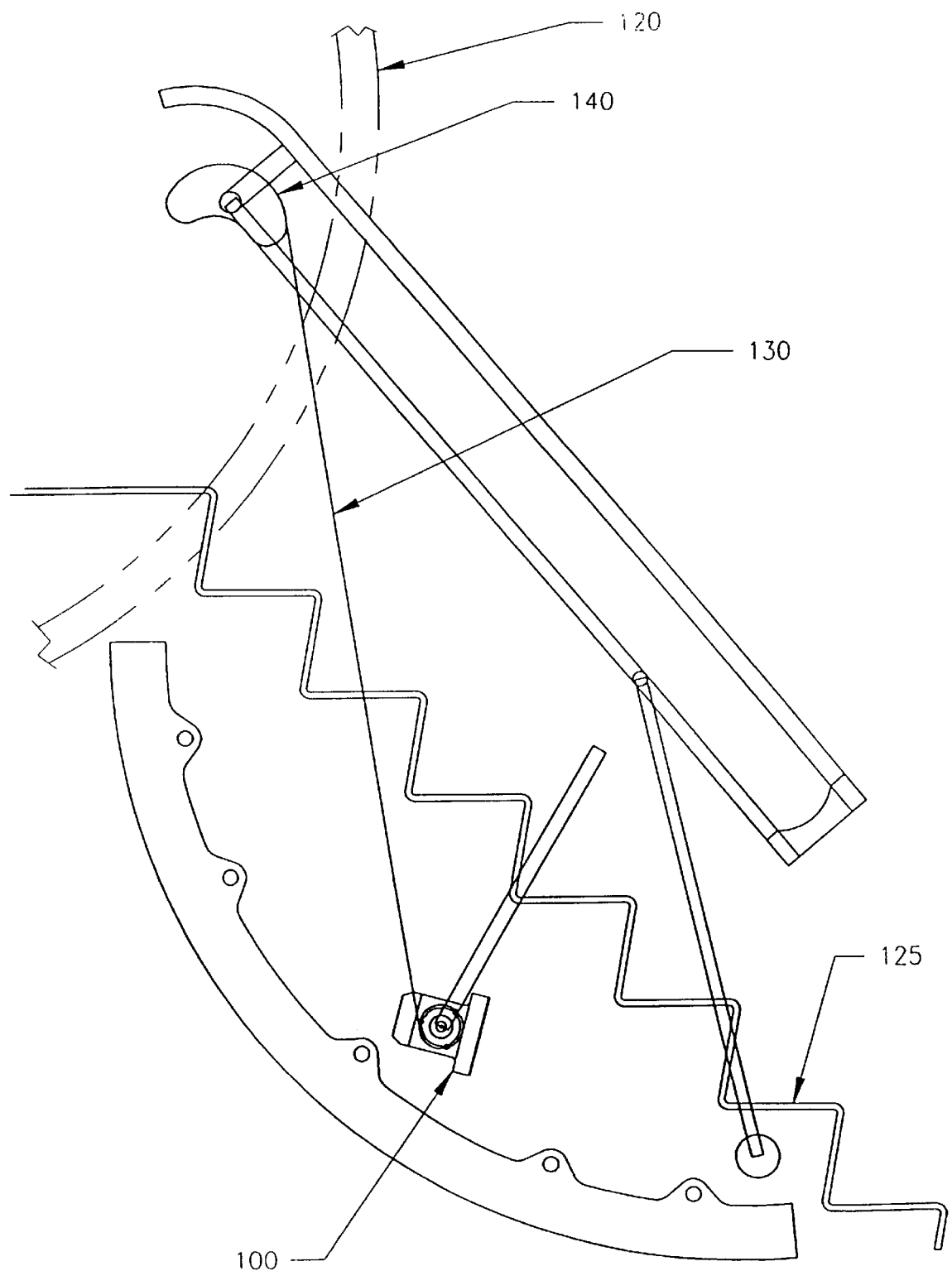
FIG. 1 shows a typical aircraft door incorporating the door actuator of the present invention.

FIG. 1 illustrates a typical aircraft door using the door actuator of the present invention. The door actuator (100) is mounted on the aircraft door beneath the stairs (125). Depressing a button instructs the actuator to raise the door to the closed position. This causes the motor in the door actuator to rotate a pulley in a counter-clockwise direction, thereby reeling in the cable (130) to pull the door upwards.

A pulley (140) provides the mechanical ground point for the cable. The process is finished when the door is flush with the fuselage (120) of the aircraft and a locking lever is moved to the locked position. This process operates in the opposite direction when the lever is pushed into the open position to cause the door to free fall open.

In the preferred embodiment, the aircraft door weighs 300 pounds and is four feet from the top to the bottom. The center of gravity for this door is located over the lower hinge point. This creates a very large downward moment of 1200 ft.-lbs. that must be gently lowered to the fully open position without power or hydraulics.

Figure 2:
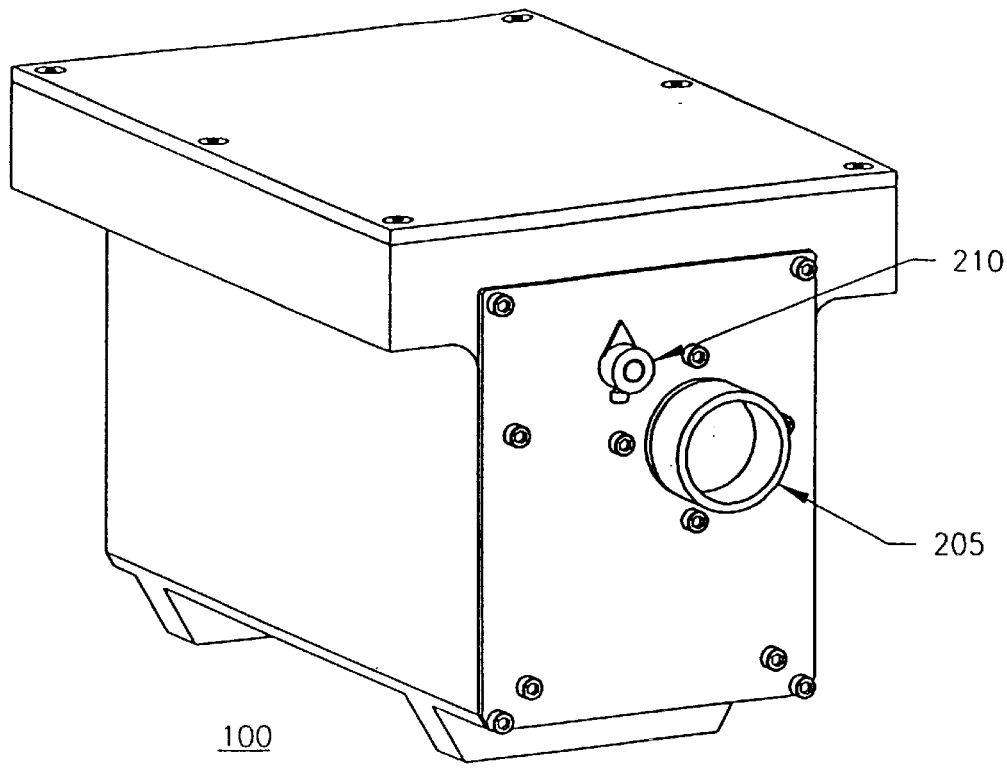
FIG. 2 shows a front perspective view of the door actuator housing of the present 20 invention.

FIG. 2 illustrates the housing for the door actuator of the present invention. This housing has a connector (205) to supply power to the motor within the housing and to provide other electrical connections. A damper adjustment indicator (210) also is evident on this side. The motor and damper adjustment indicator will be discussed subsequently in greater detail.

Figure 3:
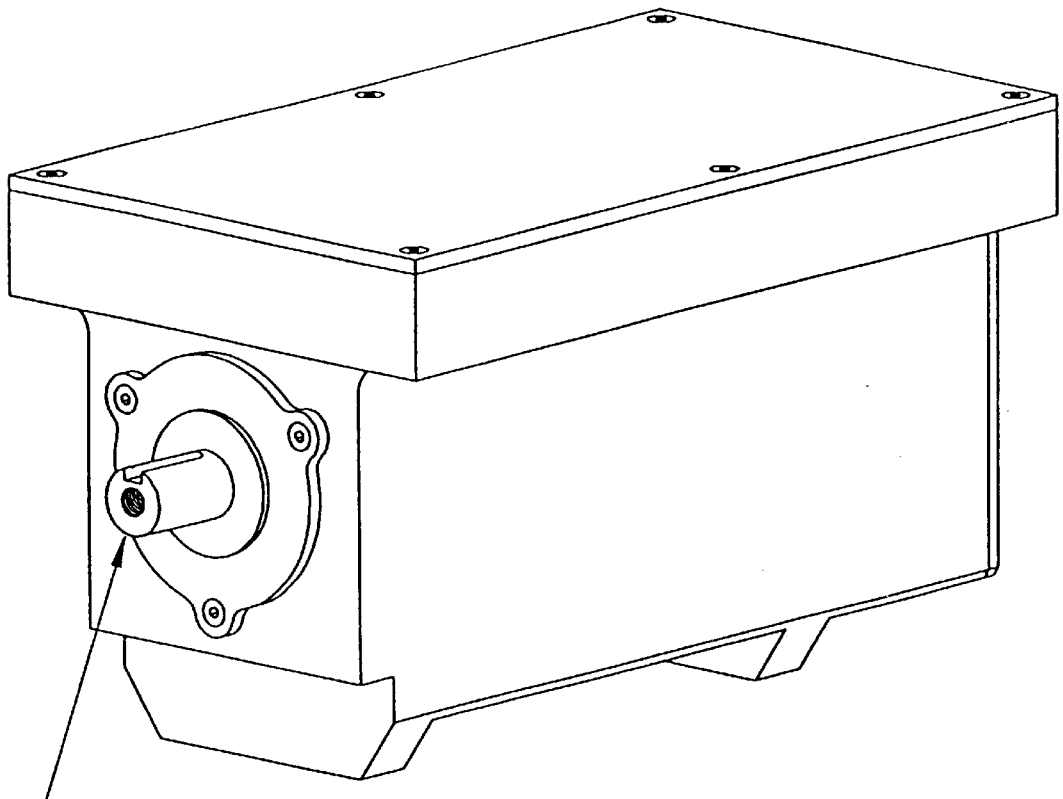
FIG. 3 shows a rear perspective view of the door actuator housing of the present invention.

FIG. 3 illustrates a rear perspective view of the housing. This view shows the output shaft (300) that couples the door actuator to the pulley that winds the cable (130) of FIG. 1.

Figure 4:
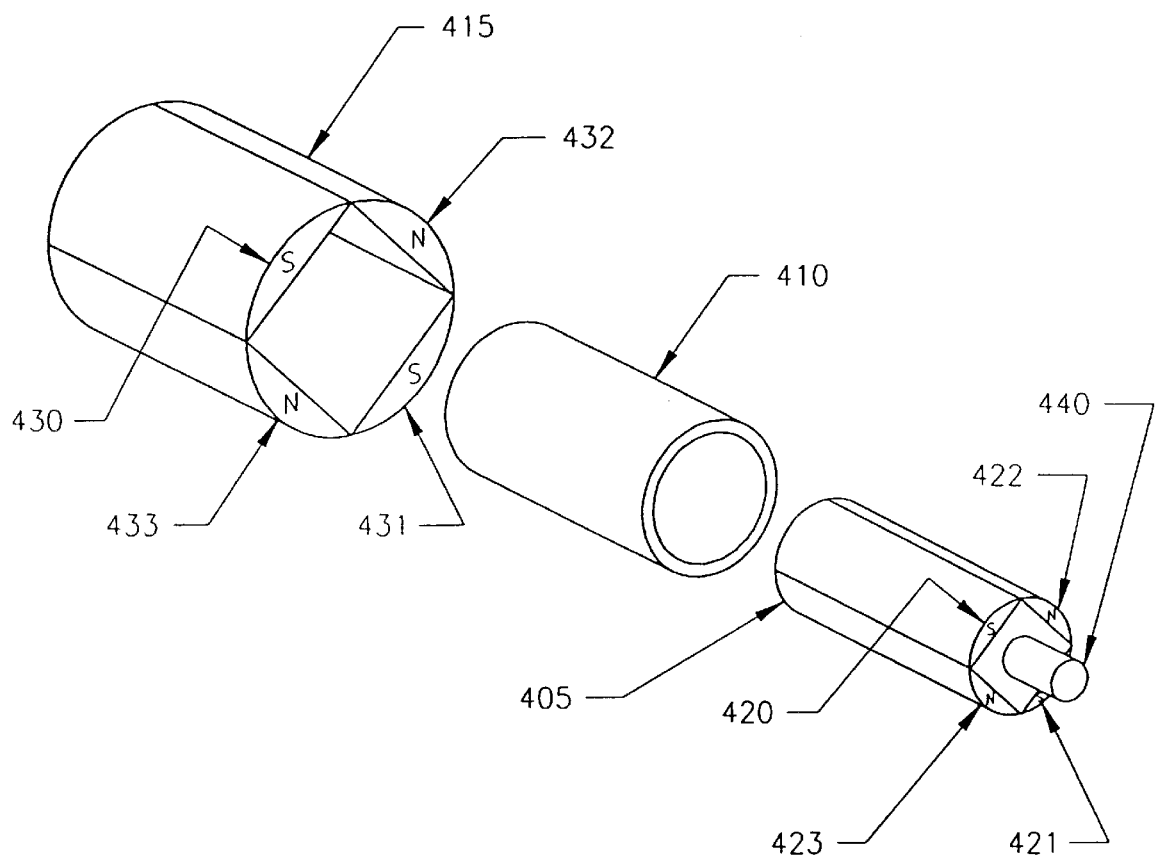
FIG. 4 shows the permanent magnet eddy-current damper of the present invention.

The magnetic eddy-current damping device (400) of the present invention is illustrated in FIG. 4. This device (400) provides the damping of the present invention without the use of electrical power. The damper is comprised of a central core (405) that is mounted on a shaft (440). This core (405) is comprised of cylindrically shaped material having magnets (420-423) mounted around the inside periphery. The magnets with the same polarity (420, 421 and 422, 423) are mounted 180° away from each other. In this view, the upper and lower magnets (422 and 423) are labeled north and the right and left magnets (420 and 421) are labeled south.

The cylindrical core (405) is mounted within a conducting cup (410). This cup (410), in the preferred embodiment, is comprised of copper. In alternate embodiments, this cup may be a copper alloy or some other conducting material.

Both the conducting cup (410) and the magnet core (405) are mounted within another cylindrical device also having magnets (430-433) mounted in the same fashion as the core. In this case, the magnets with the north polarity are (432 and 433) while the south polarity magnets are (430 and 431). These magnets on the outside cylinder are referred to as the stator magnets.

As is well known in the art, magnets having opposite polarities attract and magnets having like polarities repel. Therefore, the north rotor magnets (422 and 423) naturally try to line up with the south stator magnets (430 and 431). In this position, a very large magnetic field is established. Any conductor, such as the copper cup (410) in the preferred embodiment, will generate an eddy-current through the cup (410) when it is moved through the magnetic field. As the cup (410) rotates, eddy-currents are produced through the cup (410). The eddy-current through the cup (410) generates its own field that lags behind the stator/core magnetic field. The magnetic force caused when the induced field in the cup and stator/core field attempt to line up is the damping torque that causes the damping effect of the present invention. In the preferred embodiment, the magnetic core (405) is limited by the gearing system to 60° of rotation for five revolutions of the actuator's output shaft.

Figure 8:
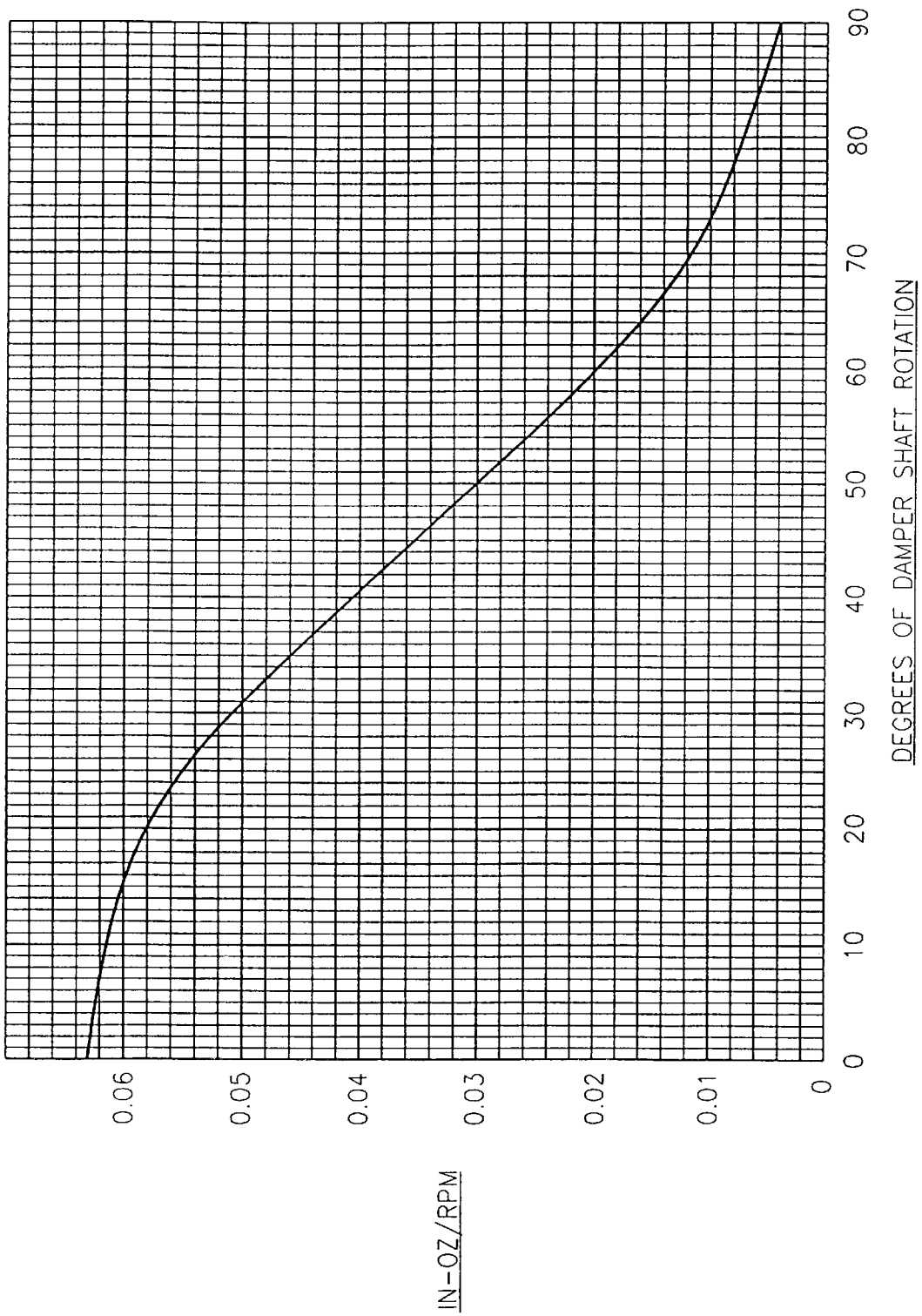
FIG. 8 shows a plot of damper shaft rotation versus damping torque.

If the shaft (440) is rotated 90° so that the south core magnets (420 and 421) are facing the south stator magnets (430 and 431), the magnetic field is canceled and there is very little damping effect. The above described relationship is shown in the plot of FIG. 8. This figure illustrates that as the shaft rotates from 0° to 90°, the damping force decreases from a maximum to a minimum of inch-ounces per RPM.

The above damping can be tailored to fit alternate situations. In the preferred embodiment, the aircraft door requires almost no damping initially and a very large amount towards the end of the travel. Alternate embodiments might require a little more damping initially and a smaller amount of damping towards the end. The damper of the present invention can be adjusted to fit these situations.

In the preferred embodiment, a 4-bar linkage is used to rotate the core magnets. Alternate embodiments use other means to adjust the core magnets to get the desired damping. These alternate means include a direct drive gear and a Geneva mechanism.

Figure 5:
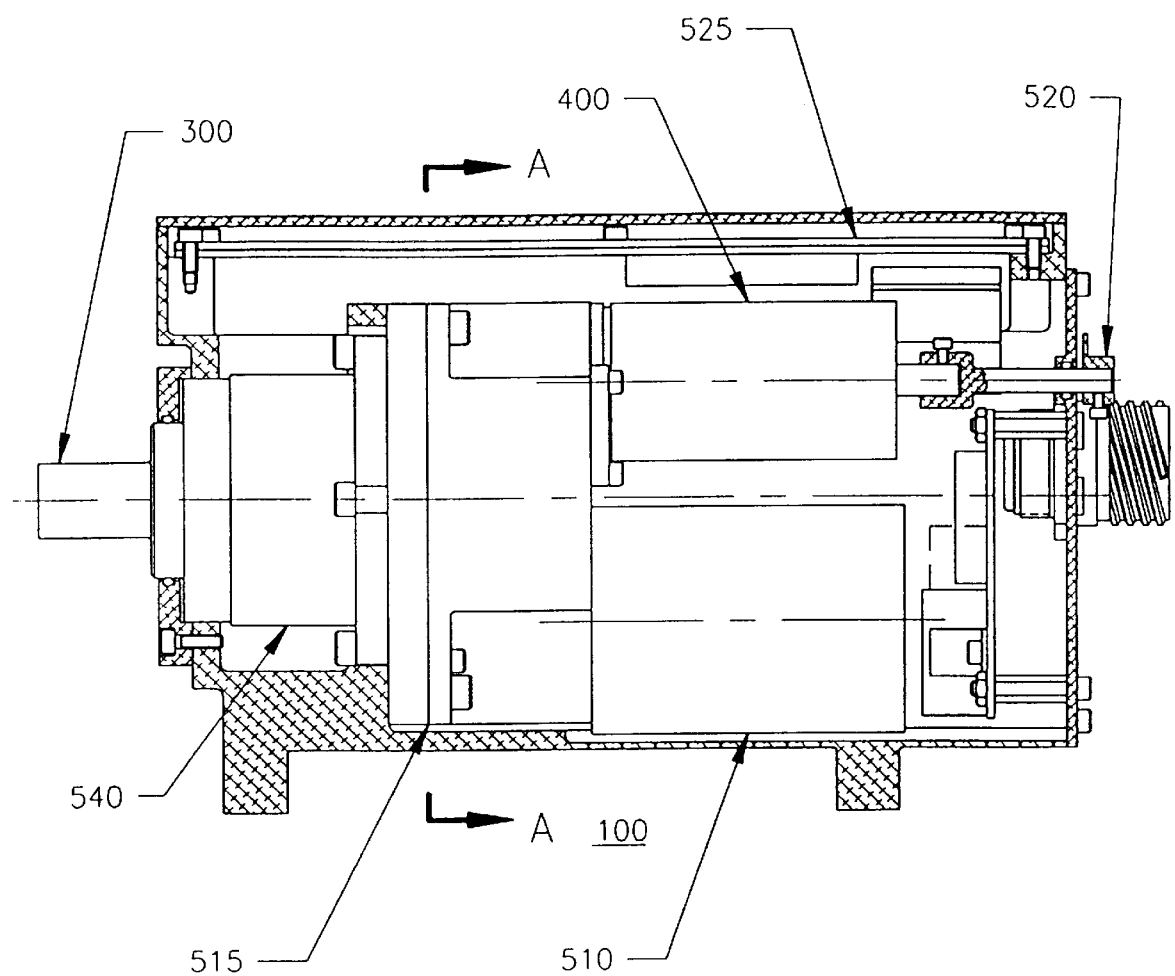
FIG. 5 shows a side cut away view of the door actuator.

FIG. 5 illustrates a cut away side view of the door actuator (100) of the present invention. This view shows the above described damper (400) and the motor (510). Both the motor (510) and damper (400) interface into a gear box (515). A damper adjustment indicator shaft (520) extends through the outer housing so that the damping rate can be monitored at any time. The other side of the damper adjustment shaft extends into the gearbox (515) and is coupled to the actuator output shaft through the adjustment mechanism. A standard size 18 planetary gearbox (540) handles the high torque loads at the output shaft.

The motor of the present invention is a brushless direct current (DC) motor manufactured by MPC Products of Skokie, Ill. In the preferred embodiment, the motor operates at 28 VDC at less than 15 amperes. Other embodiments use other types of motors with different voltages.

Also shown in FIG. 5 is a circuit board (525) that holds the actuators electronics to perform various functions. These electronic functions include EMI filtering, thermal protection, DC current limiting, and a circuit to reduce power to the motor (510) when the aircraft door is within a predetermine range of closing.

The thermal protection is provided in order to keep the DC motor (510) from over heating. If a load is placed on the motor, such as baggage or personnel left on the door as it is being retracted, the motor will generate a large amount of heat trying to lift a load greater than it is designed to lift. If this is allowed to continue, the motor will eventually burn out The thermal protection circuit, once a predetermined temperature is reached, cuts power to the motor which allows the door to drop. As the door is dropping, the damper of the present invention eases the door down to its fully open position.

The DC current limiting is provided by a pulse width modulation circuit that limits both the torque and the speed of the motor. In the preferred embodiment, the present invention is limited to 15 amps.

Typically, the DC motor is allowed to run with the full line voltage of 28 volts applied. The motor then follows its nominal torque/speed profile during most of the door retraction cycle. During the door's initial travel from the fully open position, the motor is under its greatest load and, therefore, moving at its slowest speed. As the door becomes upright, the downward moment is greatly reduced. This would cause the motor to run at its more rapid no load speed if the same voltage was applied for the entire travel distance. This stores a great deal of kinetic energy in the motor that would be dissipated into the fuselage structure at impact. Such an impact would cause damage to both the door and the fuselage structure and personal injury to the aircraft operators. To prevent such an occurrence, the motor speed and torque is reduced just prior to door closure.

Figure 10:
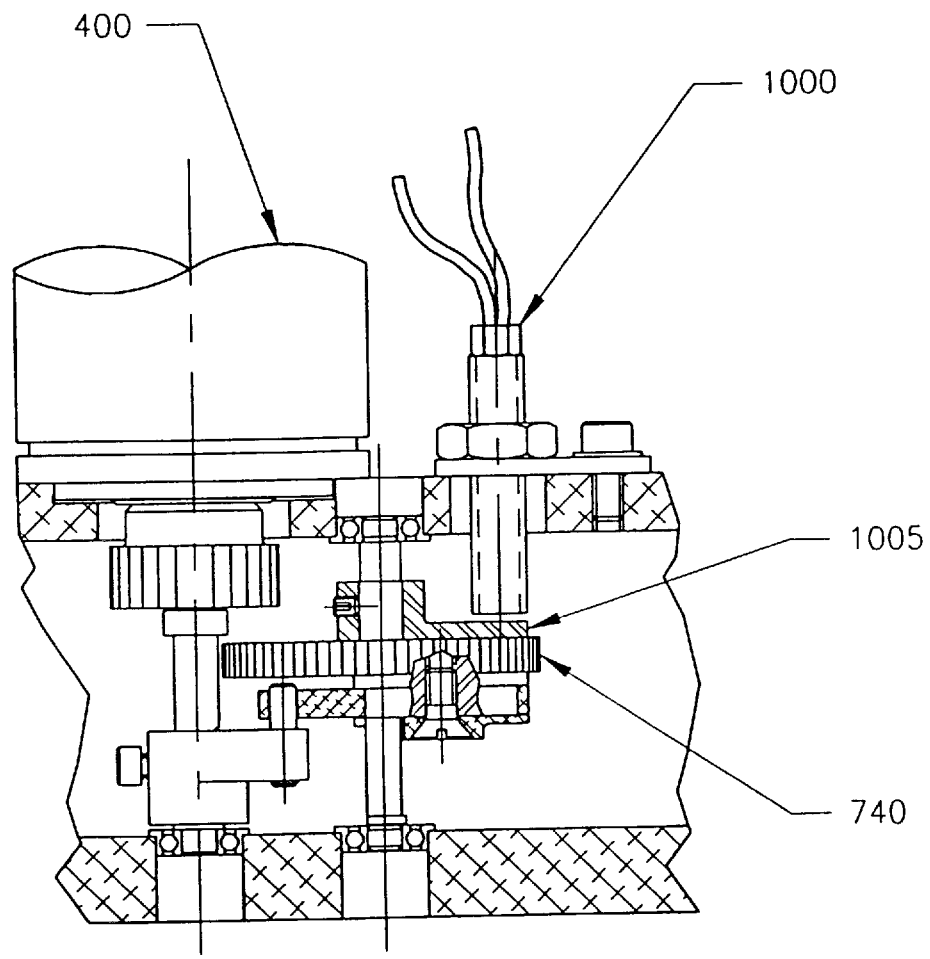
FIG. 10 shows the proximity sensor of the present invention.

The output shaft (300) goes through five revolutions from door down to door up or vice versa. Gears (720, 725, 730, 735, and 740), illustrated in FIG. 7, keep track of the number of revolutions of the output shaft when the actuator is raising the door. A single proximity sensor (1000), illustrated in FIG. 10, is energized by a metallic cam (1005) located on a gear (740). The cam (1005) rotates ½ revolution for 5 output shaft revolutions, thus the cam activates the proximity sensor at 171° of rotation. The sensor's closure initiates the change from the high voltage/high current pulse width modulation mode to a low voltage/low current pulse width modulation mode. In the preferred embodiment, the low voltage/low current are 3 VDC and 5 A.

In the preferred embodiment, once the door gets within 12° of the closed position, the sensor circuitry is tripped and the motor's speed is dropped substantially so that the door closes more slowly. The position at which the circuitry is triggered is adjustable for different situations and different doors.

Figure 6:
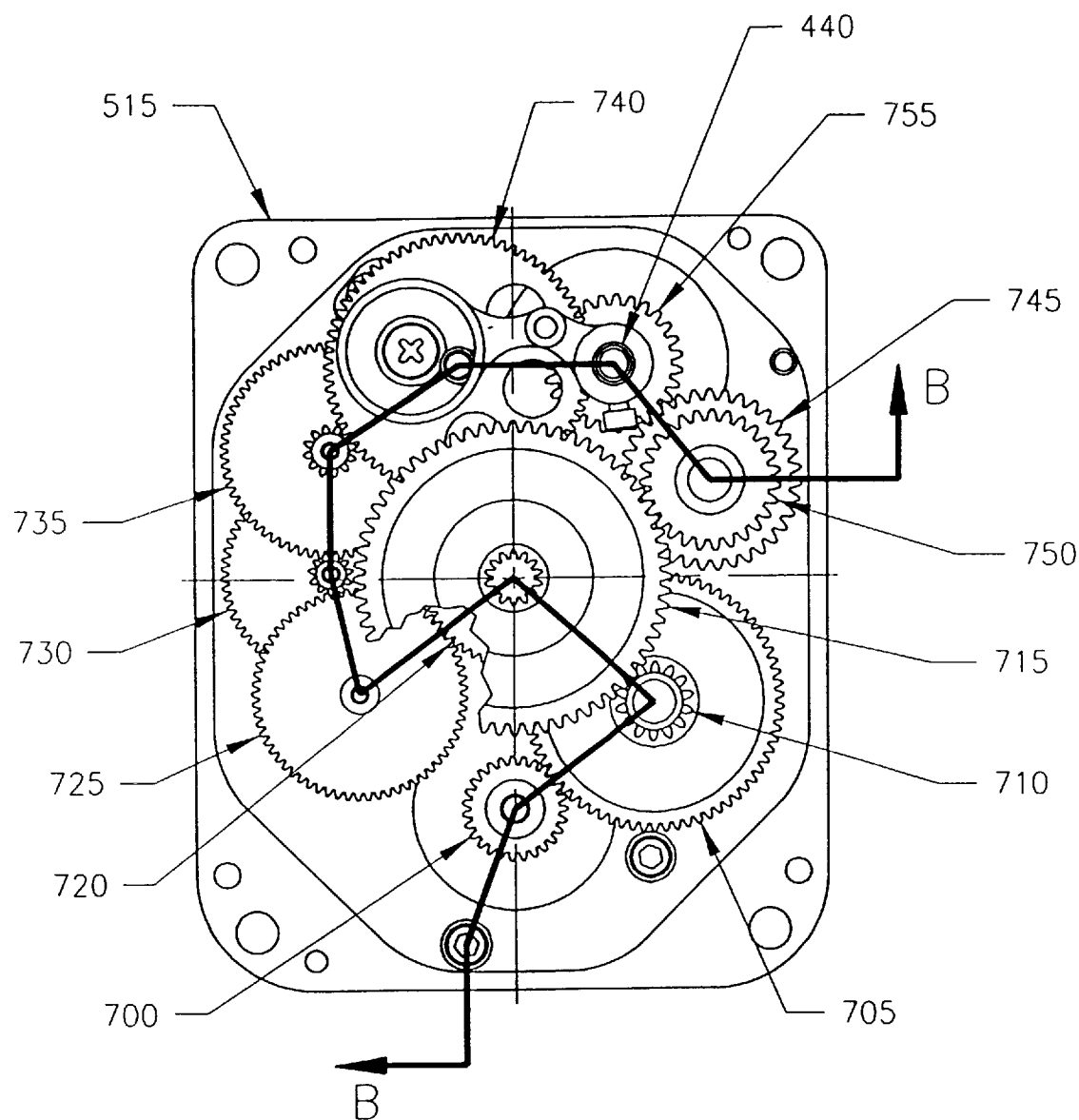
FIG. 6 shows a front cut away view of the gear box assembly.

FIG. 6 illustrates a cross-sectional view of the gear box assembly of the present invention. This view is from the shaft side of the actuator as seen by the section A—A cross-sectional mark of FIG. 5. This assembly is comprised of spur gears that handle the torque at the input shaft to the planetary gears.

Figure 7:
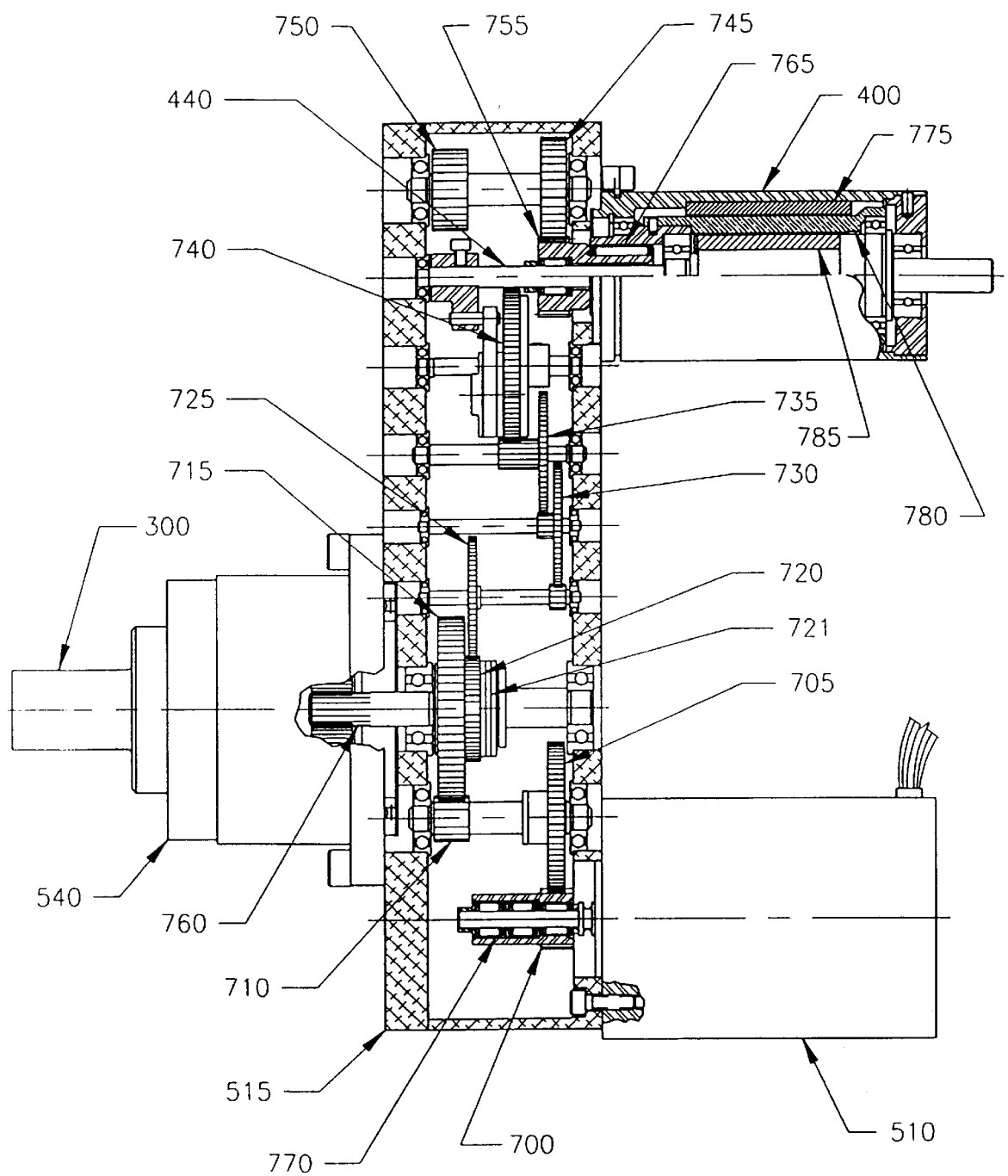
FIG. 7 shows a side cut away view of the gear box assembly.

FIG. 7 illustrates a section B—B cross-sectional view of the gear box assembly of FIG. 6. This view shows the motor (510), the damper (400), and the drive shaft (530). In the preferred embodiment, the gearing is manufactured from stainless steel.

When the door actuator of the present invention is in the powered door retraction mode, the motor (510) is turned on and driving the gears through a total ratio of 320:1 to make the torque and rate necessary to lift the door. In this mode, the gear coupled to the motor output shaft (700) directly drives gear (705). This gear (705) drives the shaft that has another gear (710) that drives the gear (715) on the gearbox output shaft (760). This shaft (760) drives the planetary gearing (540) that in turn drives the actuator output shaft (300).

If the door, in its upward travel, strikes something, a slip clutch (721) is used as overload protection. This prevents the gears and shafts from being damaged from a load rapidly forcing the motor in the opposite direction. Should it be necessary to deploy the door manually, the slip clutch also releases the damper and motor from the gear system The slip clutch is located within the gear train at a ratio of 27:1 from the output and is set to activate at a torque above a predefined limit I the preferred embodiment, this predefined limit is 800 in.-lbs. maximum load, below the gear train's maximum static rating of 850 in.-lbs. in the preferred embodiment. Alternate embodiments would use other maximum loads and other gear trains in other embodiments would have other maximum static ratings.

A first overrunning clutch (765), acting like a mechanical diode, is used to decouple the damper from the gear system when the actuator is raising the door. This overrunning clutch allows the motor to raise the door without fighting the damping effect of the damper. The conductive cup is driven by gear (755) through the first overrunning clutch (765). FIG. 7 also illustrates a cutaway view of the damper showing the stator magnets (775), the copper cup (780), and the rotor magnets (785).

Similarly, a second overrunning clutch (770) decouples the motor from the gear system when the door is being raised manually to the closed position. In the preferred embodiment, these overrunning clutches are miniature roller/ram type clutches. Other embodiments use other types of clutches to achieve the same results. This means a person closing the door manually would not have to fight the motor or damper drag.

Figure 9:
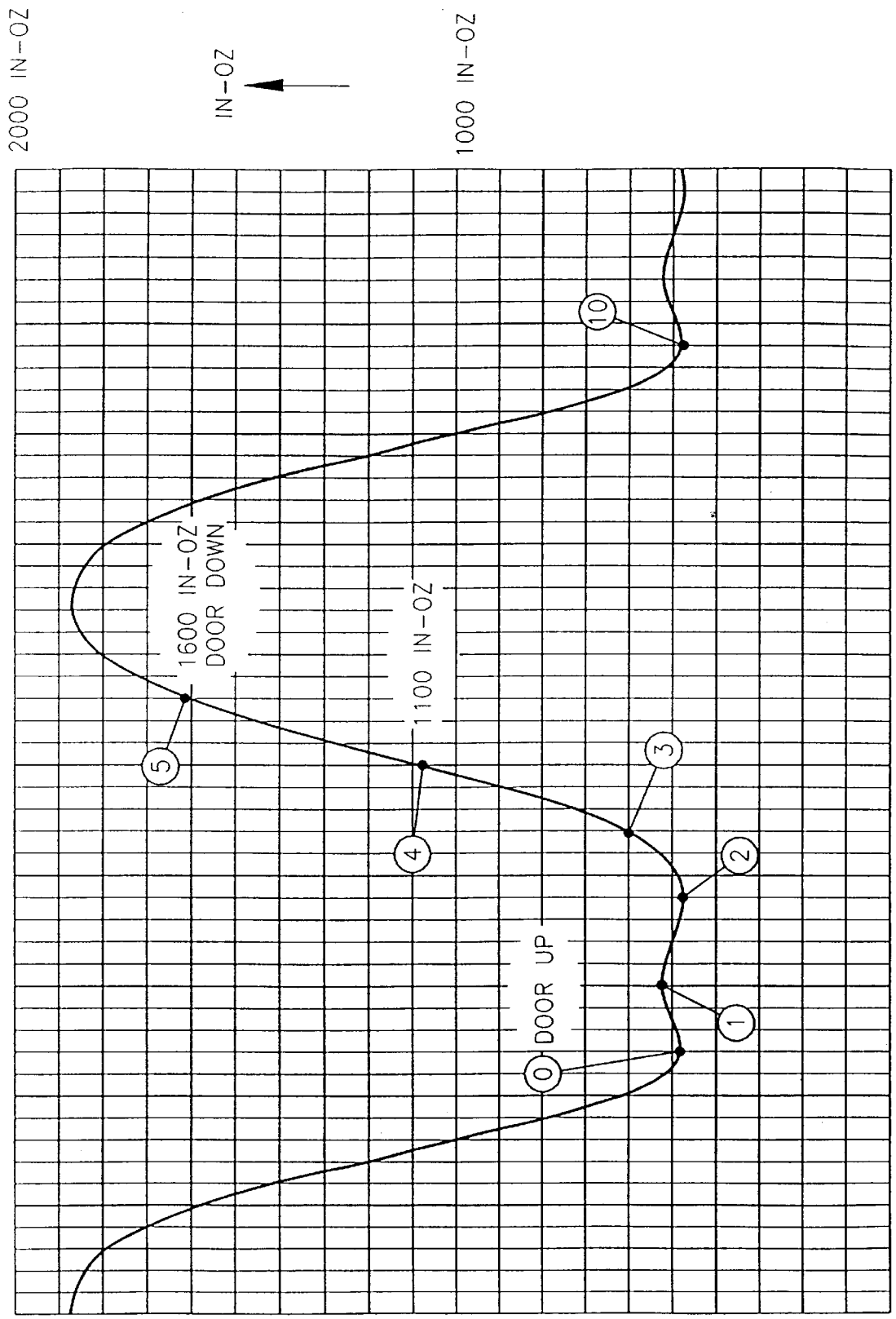
FIG. 9 shows a measure of data of actuator shaft revolutions versus damping torque.

FIG. 9 illustrates a plot of actual test data for the door actuator of the present invention. This plot shows damping force in inch-ounces on the vertical axis and number of revolutions on the horizontal axis. Each revolution of the output shaft of the door actuator is shown next to its point on the curve. This plot shows that damping during the first 3 revolutions of the output shaft is at a minimum. However, as the shaft goes from 3 to 4 revolutions and from 4 to 5 revolutions, the damping torque rises substantially.

To summarize the operation of the present invention, the user unlatches and pushes the door to start the unpowered deployment operation. The actuator of the present invention allows the door to drop while the damper applies very little damping during the initial portion of travel. As the door progresses, the downward moment is increasing rapidly. However, also as the door progresses, the damper force is increasing along with the moment. As the door reaches the fully open position, the downward moment is at the maximum and the damping force is rapidly increased to a maximum, therefore gendy setting down the door. The door can be opened, without power or hydraulics, in less than 10 seconds.

In the opposite direction, when the door is raised to the closed position, the damper is decoupled from the gear system and the motor provides the positive torque to raise the door to the closed position. As the door reaches a point in the upward travel where the downward moment is substantially reduced and the motor is running at higher speed, the actuator slowing circuit causes the motor to slow to and, therefore, gently close the door.

Of course, alternate embodiments could use different types of doors and still remain within the bounds of the present invention. Such a door could be a clamshell type door that opens up as well as down. Another type door would open up only.

We claim:

1. A load damping system that provides a damping force for a load having a non-linear moment as it moves, the system comprising:

a first set of magnets forming a cylindrical shape about a damper shaft, the first set of magnets having opposing north poles and opposing south poles;

a conducting material laterally encircling the first set of magnets;

a second set of magnets laterally encircling the conducting material, the second set of magnets having opposing north poles and opposing south poles; and a system of gears having an output shaft coupled to the load, the system of gears being coupled to the damper shaft, for controlling the rotation of the first set of magnets such that the first set of magnets is positionable relative to the second set of magnets.

2. The system of claim 1 wherein the first and second set of magnets are permanent magnets and the conducting material is a copper based material.

3. The system of claim 1 wherein the system of gears controls the rotation of the damper shaft to no more than 90° of rotation.

4. The system of claim 1 and further including an overrunning clutch coupled to the system of gears such that the load damping system provides the damping force in only one direction of rotation of the damper shaft and decouples the damper shaft in the other direction of rotation of the damper shaft.

5. The load damping system of claim 1, wherein said damping force is provided by eddy currents such that said system is characterized as an eddy current load damper system.

6. An actuator for moving a load having a non-linear moment over the interval of travel, the actuator comprising:

a first set of magnets forming a cylindrical shape about a damper shaft, the first set of magnets having opposing north poles and opposing south poles;

a cylindrically shaped conducting material laterally encircling the first set of magnets;

a second set of magnets laterally encircling the conducting material, the second set of magnets having opposing north poles and opposing south poles;

a system of gears having an output shaft coupled to the load, the system of gears being coupled to the damper shaft, for controlling the rotation of the first set of magnets such that the first set of magnets is positionable relative to the second set of magnets; and a motor coupled to the system of gears such that the motor drives the output shaft through the system of gears to move the load in a first direction of the travel interval.

7. The system of claim 6 and further including a first overrunning clutch, coupled to the system of gears and the damper shaft, to limit the damper shaft to one direction of rotation such that the damper shaft is disengaged from the system of gears when the motor is moving the load in the first direction of travel.

8. The system of claim 7 and further including a second overrunning clutch, coupled to the system of gears, to disengage the motor from the system of gears when the load is moving in a second direction of the travel interval.

9. The system of claim 6 and further including a shaft rotation counter coupled to the system of gears for counting the revolutions of the output shaft and indicating a predetermined number of output shaft rotations.

10. The system of claim 9 and further including a proximity sensor that outputs a signal to slow the output shaft revolutions in response to the indication of the predetermined number of output shaft rotations.

11. The system of claim 6 wherein the motor is a DC brushless motor.

12. The system of claim 6 and further including a slip clutch coupled to the system of gears and the output shaft, the slip clutch disengaging the system of gears from the output shaft upon input of a force greater than a predetermined torque level.

13. An actuator for moving an aircraft door having a non-linear moment over the interval of travel, the interval of travel being defined by a first position at one end and a second position at the other end, the actuator comprising:
  a magnetic, load damping device for providing a variable damping force that increases as the aircraft door moves from the first position to the second position, the load damping device having a damping shaft;
  a system of gears having an output shaft coupled to the aircraft door, the system of gears being coupled to the damping shaft for controlling the rotation of said damping shaft to less than 90°, the system of gears including a rotational counter for counting the output shaft rotations;
  a motor coupled to the system of gears such that the motor provides positive torque to the output shaft through the system of gears to move the aircraft door from the second position to the first position, the motor having a first input power and a second input power that is less than the first input power;
  a first overrunning clutch, coupled to the motor, allowing the motor to provide positive torque only when the aircraft door is moving from the second position to the first position; and
  a second overrunning clutch, coupled to the load damping device, allowing the load damping device to provide the damping force only when the aircraft door is moving from the first position to the second position.

14. The actuator of claim 13 wherein the magnetic, load damping device comprises:
  a first set of magnets attached to a damper shaft so as to form a cylindrical shape, the first set of magnets having opposing north poles and opposing south poles;
  a cylindrically shaped conducting material laterally encircling the first set of magnets; and
  a second set of magnets laterally encircling the conducting material in a cylindrical shape, the second set of magnets having opposing north poles and opposing south poles.

15. The actuator of claim 14, further comprising means for actively controlling said system of gears such that said first set of magnets is actively positionable relative to the second set of magnets in response to movement of said load.

16. The actuator of claim 13 wherein the first input power is a high voltage and high current pulse width modulated power and the second input power is a low voltage and low current pulse width modulated power.

17. The actuator of claim 13, wherein said variable damping force comprises eddy currents set up by said magnetic load damping device.

18. A variable eddy-current load damper system comprising:
  a first set of magnets forming a substantially cylindrical shape about a rotatable shaft, the first set of magnets being arranged in an opposing north pole and an opposing south pole configuration;
  a second set of magnets laterally encircling the first set of magnets, the second set of magnets being arranged in an opposing north pole and an opposing south pole configuration;
  a conducting material, located between the first and second set of magnets and forming a cylindrical shape around the first set of magnets, the conducting material being supported for rotation between the first and second set of magnets, whereby an eddy-current is created in the conducting material during rotation thereof, said eddy-current increasing in strength as the north poles of the first set of magnets approach the south poles of the second set of magnets; and
  at least one active magnet positioning means coupled to said shaft, said conducting material and a load whose movement is to be damped, said positioning means rotating said conducting material and automatically positioning said first set of magnets relative to said second set of magnets upon movement of said load.

19. The variable eddy current damper of claim 18, wherein said active positioning means comprises at least one gear.

20. An active load damping system that provides a damping force for a load having a non-linear moment as it moves, the system comprising:
  a first set of magnets forming a cylindrical shape about a damper shaft, the first set of magnets having opposing north poles and opposing south poles;
  a conducting material laterally encircling the first set of magnets;
  a second set of magnets laterally encircling the conducting material, the second set of magnets having opposing north poles and opposing south poles;
  a system of gears having an output shaft coupled to the load, the system of gears being coupled to the damper shaft, said system of gears further comprising means for actively controlling the rotation of the first set of magnets such that the first set of magnets is actively positioned relative to the second set of magnets to vary the damping force provided, compensating for the non-linear moment of the load.

* * * * *